T. P. TURNER.
AUTOMOBILE TIRE REMOVER.
APPLICATION FILED MAR. 17, 1919.
1,318,032.
Patented Oct. 7, 1919.
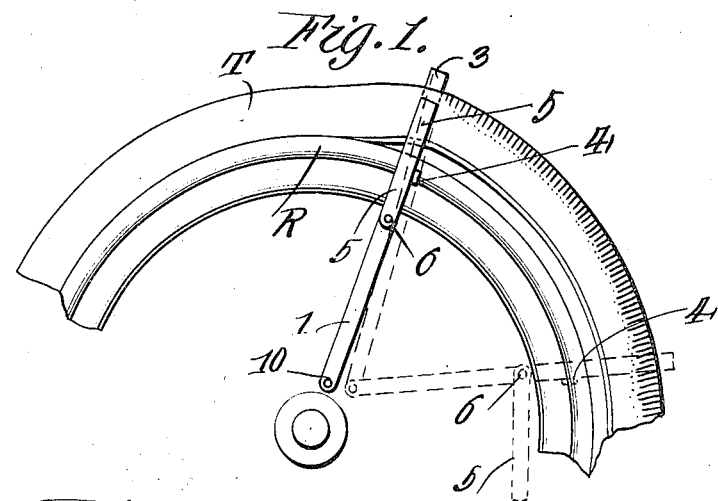
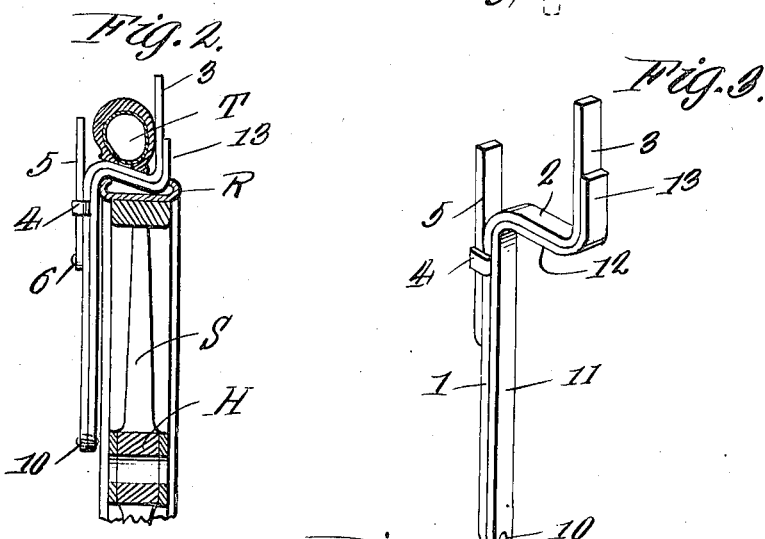
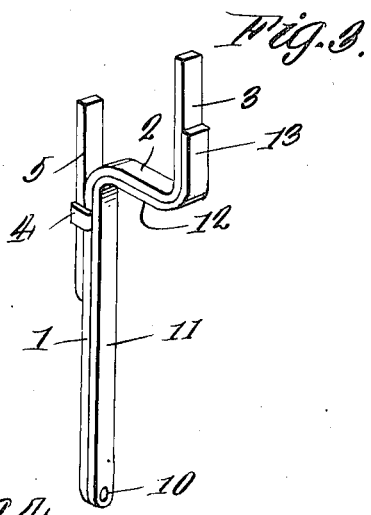
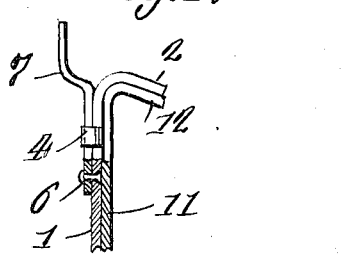
WITNESS:
Guy M. Spring
N. L. Collamer
INVENTOR.
Thomas P. Turner
BY
Richard B. Owen
ATTORNEY.

UNITED STATES PATENT OFFICE.

THOMAS P. TURNER, OF DURAND, MICHIGAN.

AUTOMOBILE-TIRE REMOVER.

1,318,032.  Specification of Letters Patent.  Patented Oct. 7, 1919.

Application filed March 17, 1919. Serial No. 283,130.

*To all whom it may concern:*

Be it known that I, THOMAS P. TURNER, a citizen of the United States, residing at Durand, in the county of Shiawassee and State of Michigan, have invented certain new and useful Improvements in Automobile-Tire Removers, of which the following is a specification.

This invention relates to tools for removing tires, and more especially rubber ties; and the object of the same is to produce a tool whereby a heavy or stiff tire casing may be lifted off of a wheel rim so that a tire tool can be inserted under the same to pry it completely out of place.

The object is carried out by making the tool in the shape of two members pivotally connected at one end and having angularly bent fingers at their other ends so as to pass under the tire, one member being provided with a long tongue which constitutes a handle, and having an additional handle pivoted thereto. Details are set forth in the following specification and claims, and in the drawings herewith—

Figure 1 is a side elevation of a portion of an automobile wheel with this tool applied and in use.

Fig. 2 is a radial section through the wheel and an edge view of the tool.

Fig. 3 is a perspective view of the tool itself.

Fig. 4 is a sectional detail of a slightly modified form of tool.

The wheel is shown comprising a hub H from which radiates spokes S to a rim R, and the ordinary pneumatic tire T is to be placed around this rim and secured thereto by suitable means not necessary to amplify. It is well known to the autoist that a tight tire is extremely difficult to lift out of a rim, especially when the latter is channeled. The main difficulty lies in lifting one bead of the tire casing sufficiently from the rim to enable the insertion of an ordinary tool, and unless the tire is lifted clear of the edges of the rim, the tire tool may not be successfully used in prying it out of place entirely. This difficulty I propose to overcome by the use of my special tool as described below.

Coming now to the details of the present invention, I provide twin or substantially duplicate elements, whereof one consists of a body 1 having an angular finger 2 extending to one side thereof, from which extends at substantially right angles a long tongue 3, while the second element consists of a similar body 11 pivoted at its inner end to the first at 10, the body 11 having a finger 12 extending to one side thereof and this finger 12 is bent outward to form a tongue 13 which is, however, a little shorter than the inner tongue 3 as best seen in Fig. 3. These elements may be made of strap iron or steel. The body of the inner element carries a stop 4 against which swings a handle 5 pivoted at 6 to said body as best seen in Fig. 2; and if desired the handle itself may be offset as shown at 7 in Fig. 4 to bring it farther away from the tire T although ordinarily the handle will pass along the side of the tire as shown in Fig. 2.

In the use of this tool, the two elements are disposed side by side as shown in Fig. 3 and the tip of the tongue 3 inserted over the edge of the rim R and under the tire T, then pushed across beneath the latter and lifted a little, thus bringing the other tongue 13 along with it, and finally the entire tool is turned down to the position shown in Fig. 2 when the tongue 13 and tongue 3 rise at one side of the tire with the tongue 3 next to it, and the handle 5 rises at the other side of the tire or may be offset a little distance from it, as shown in Fig. 4. Now the operator grasps the handle and the long tongue 3 and swings the entire element 1 around the pivot 10 down to the dotted position shown in Fig. 1, and then he swings the handle 5 on its pivot 6 away from its stop 4 and to the dotted position shown at the right of this view. The tire is now raised considerably from the rim, and an ordinary tire tool may be inserted in a manner which will be clear. The distance through which the element 1 is moved from the point of its first insertion is not essential, but it should be sufficient to provide a space into which the ordinary tire tool or perhaps the hand may be inserted, the obvious eventual purpose being to pull the tire casing off the wheel for repair.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a tire tool, the combination with a pair of elements having straight bodies having angular fingers at their outer ends adapted at times to overlap, and angular tongues beyond the fingers adapted at times to overlap, of a pivot between the remote ends of the bodies, and a handle pivoted to one of said elements, for the purpose set forth.

2. In a tire tool of the class described, the combination with a pair of elements comprising each a straight body having a finger extending to one side thereof at its outer end and continued thence in a tongue standing in a line parallel to its body, the respective parts of one element adapted at times to underlie those of the other; of a pivot between the remote ends of said bodies, a stop at one edge of one element, and a handle pivoted to the face of this element and adapted to lie against said stop, the whole for use substantially as described.

3. In a tire tool, of the class described, the combination with a pair of elements comprising each a body having a finger extending to one side thereof at its outer end, the respective parts of one element adapted at times to underlie those of the other; of a pivot between the remote ends of said bodies, a stop at one edge of one element, and a handle pivoted to the face of this element and adapted to lie against said stop, the whole for use substantially as described.

In testimony whereof I affix my signature in presence of two witnesses.

THOMAS P. TURNER.

Witnesses:
RITTA M. POWER,
SETH B. TERRY.